US012007260B2

(12) United States Patent
Gurevich et al.

(10) Patent No.: US 12,007,260 B2
(45) Date of Patent: Jun. 11, 2024

(54) DEVICE FOR MEASURING FLUID FLOW

(71) Applicant: OIL & GAS MEASUREMENT LIMITED, London (GB)

(72) Inventors: Mikhail Gurevich, London (GB); Terence Cousins, Salisbury (GB); Julien Porre, Cheltenham (GB); Renaud Bourga, Ely (GB)

(73) Assignee: OIL & GAS MEASUREMENT LIMITED, London (GB)

( * ) Notice: Subject to any disclaimer, the term of this patent is extended or adjusted under 35 U.S.C. 154(b) by 38 days.

(21) Appl. No.: 17/369,592

(22) Filed: Jul. 7, 2021

(65) Prior Publication Data

US 2022/0018694 A1 Jan. 20, 2022

(30) Foreign Application Priority Data

Jul. 7, 2020 (GB) ..................................... 2010423
Jul. 7, 2021 (GB) ..................................... 2109796

(51) Int. Cl.
*G01F 1/667* (2022.01)
*G01F 1/66* (2022.01)

(52) U.S. Cl.
CPC ............. *G01F 1/667* (2013.01); *G01F 1/662* (2013.01)

(58) Field of Classification Search
CPC ............. G01F 1/667; G01F 1/662; G01F 1/66
See application file for complete search history.

(56) References Cited

U.S. PATENT DOCUMENTS

| 2,746,291 | A | 5/1956 | Swengel |
| 6,026,693 | A | 2/2000 | Baumoel et al. |
| 6,098,466 | A | 8/2000 | Shkarlet |
| 8,336,394 | B2 | 12/2012 | Laurent |
| 2007/0293855 | A1* | 12/2007 | Sliwa ..................... A61B 18/18 606/41 |
| 2017/0074698 | A1 | 3/2017 | Teufel et al. |
| 2018/0133744 | A1* | 5/2018 | Gorbunov ................ B05C 3/02 |
| 2018/0299305 | A1 | 10/2018 | Starke et al. |
| 2020/0003593 | A1 | 1/2020 | Mayle et al. |
| 2020/0033169 | A1* | 1/2020 | Sonnenberg ........... G01F 1/667 |
| 2020/0158693 | A1* | 5/2020 | Bober ..................... G01F 1/668 |
| 2021/0356303 | A1* | 11/2021 | Bertram ................. G01F 1/667 |

FOREIGN PATENT DOCUMENTS

| EP | 0301697 A2 * | 2/1989 | |
| EP | 2154491 A1 * | 2/2010 | ............ G01F 1/662 |
| JP | H11-325993 A | 11/1999 | |
| KR | 10-2013-0100563 A | 9/2013 | |
| RU | 2756683 C1 * | 10/2021 | .............. B21D 9/00 |
| WO | 2009/074162 A1 | 6/2009 | |

(Continued)

OTHER PUBLICATIONS

Machine translation of RU27356683C1 (Year: 2021).*

(Continued)

*Primary Examiner* — Alexander Satanovsky
*Assistant Examiner* — Sangkyung Lee
(74) *Attorney, Agent, or Firm* — Oliff PLC

(57) ABSTRACT

An invention relates to a device for measuring fluid flow in a pipe, in particular a device using ultrasound transducers for measuring fluid flow in a pipe, and a method for measuring fluid flow in a pipe using said device.

18 Claims, 3 Drawing Sheets

(56) References Cited

FOREIGN PATENT DOCUMENTS

| WO | WO-2014032083 A1 * | 3/2014 | ............... G01F 1/66 |
| WO | 2017/078559 A1 | 5/2017 | |
| WO | WO-2017182344 A1 * | 10/2017 | |

OTHER PUBLICATIONS

Machine translation of EP0301697A2 (Year: 1989).*
H.Gai, "An Integral Ultrasound Transducer/Pipe Structure for Flow Imaing," 1989 Ultrasonics Symposium. (Year: 1989).*
Jan. 7, 2021 Search Report issued in UK Patent Application No. GB2010423.8.

* cited by examiner

DEVICE FOR MEASURING FLUID FLOW

This invention relates to a device for measuring fluid flow in a pipe, in particular a device using ultrasound transducers for measuring fluid flow in a pipe.

Ultrasound flow meters are used for measuring the flow rate and in diagnostic measurement, for example in order to detect leaks or the rate of deposition of corrosion in a pipe, of fluids, for example gases or liquids or a combination of gases and liquids, in a variety of industries. One example is in the oil and gas industry in order to determine the quantity of oil and/or gas being transferred from the custody of one party to that of another through a transfer pipe.

The principle of using ultrasound flow meters relies on the difference in time taken by ultrasound beams to travel within the fluid being measured upstream between two transducers located on the pipe wall and to travel downstream between the same two transducers being subject, amongst other things, to the flow rate of that fluid. The velocity V of the fluid is given by the following equation:

$$V = \frac{L\Delta T}{2t_{ab}t_{ba}\cos\alpha}$$

wherein L is the distance between the two transducers on opposing walls of the pipe, $\Delta T$ is the difference between the time the ultrasonic beams tool to travel between the two transducers in both directions, $t_{ab}$ is the time the ultrasonic beam took to travel from transducer "a" to transducer "b" and $t_{ba}$ is the time the ultrasonic beam took to travel from transducer "b" to transducer "a", and $\alpha$ is the angle between the direction of the flow of the fluid being measured and L. The flow rate is the product of the arithmetic mean of all values of V and the area of the orthogonal cross-section of the pipe.

It has been observed that as the effective internal diameter of the transfer pipe is reduced, the number of ultrasound transducers must be reduced due to the physical constraints of fitting the transducers around pipes of smaller internal diameter given that ultrasound transducers cannot themselves be smaller than about 5 mm in diameter. If there are insufficient transducers, the meter cannot determine the flow rate profile across the pipe, and thus the measured mean flow rate may be inaccurate.

Transducer ports interfere with propagation of the ultrasound beams. This effect is enhanced as the pipe internal diameter decreases because the transducer size remains constant and hence the transducer port size becomes larger relative to the pipe. This problem is particularly enhanced near the walls of the pipe where the beam has a shorter effective path length between emitting and receiving transducers because of the curvature of the pipe at that point and also because the curvature of the pipe leads to deeper transducer ports. Shorter beam paths produce less accurate measurements of flow rate because the measurement is based on the time it takes for the beam to travel between two transducers. One way to increase path length and hence accuracy is to bounce the beam along the pipe, however a small internal diameter pipe has a very tight radius and the inside surface of such pipes have a tendency to spray the reflected beam reducing accurate measurement.

There is thus a particular need for a device for measuring fluid flow in small pipes, for example, of effective internal diameter 150 mm or less, which overcomes one or more of the foregoing technical problems. By effective diameter is meant that should the cross-section of the pipe be polygonal in shape, it is the longest diagonal between two vertices or is equal to the internal diameter of a circular pipe encompassing a polygonal cross-sectioned pipe of infinitely thin wall thickness. Should the pipe be circular, then the effective diameter is equal to the diameter.

It has been observed that a device for measuring fluid flow in a pipe comprising an even number of walls in the range 4-16 wherein opposing walls of the pipe section are of identical length and width provides a solution to the foregoing technical problems by providing transducer ports, the depth of which is not affected by their location in the pipe, and whose depth is relatively shallow compared to those found in pipes of circular orthogonal cross-section.

U.S. Pat. No. 8,336,394 (Metering & Technology SAS) relates to a device for measuring the flow rate of a fluid flowing in a pipe. FIG. 1 of U.S. Pat. No. 8,336,394 illustrates a device (10) for measuring the flow rate of a fluid flowing in a pipe, especially for a transaction between a hydrocarbon supplier and a hydrocarbon purchaser is provided. The device (10) has a cylindrical body (11) to be interposed between two sections of the pipe. Ultrasound-beam transducers (15) are mounted on the main body (11) and intended to measure at least a rate of movement of the fluid stream as this flows through the device (10). At least one converter converts the signals emitted by the transducers into a flow rate signal. The transducers (15) are mounted and uniformly distributed on two coaxial parallel rings (12, 13). The transducers (15) of a first ring (12) are angularly offset relative to the transducers of the second ring (13)

JP 11 325993 (Kaijo Corporation) relates to an ultrasound meter. FIG. 1B of JP 11 325993 illustrates a rectangular cross-section of a flow passage for a fluid, the flow passage comprising ultrasound transducers wherein the direction of propagation of the ultrasound waves is in the plane of the long sides of the rectangular cross-section. Furthermore, in order to prevent formation of vortexes, each corner of the cross-section is slightly rounded.

SUMMARY OF INVENTION

In a first aspect of the invention, a device for measuring fluid flow in a pipe is provided, the device comprising:
  (a) A pipe section comprising an even number of walls in the range 4-16, a first and second end, and a longitudinal axis, the pipe section of polygonal cross-section, and wherein the ratio of the width to the height of the cross-section is in the range 0.3:1 to 1:0.3;
  (b) A plurality of ultrasound transducers, wherein each ultrasound transducer comprises an emitter and receiver, each ultrasound transducer arranged on the walls of the pipe section and generating a signal when the transducers emit ultrasound through any fluid flowing in the pipe section and/or receive said ultrasound; and
  (c) A signals converter for processing the signals into a fluid flow rate value;
  wherein opposing walls of the pipe section are of identical length and width;
  wherein the plurality of ultrasound transducers comprise pairs of ultrasound transducers arranged on opposing walls or the same wall of the pipe section,
  wherein the device comprises at least two pairs of ultrasound transducers,
  wherein each pair of ultrasound transducers comprises a first and second ultrasound transducer, the first ultrasound transducer arranged to emit ultrasound through any fluid flowing in the pipe section towards the second ultrasound transducer and to receive ultrasound emitted by the second ultrasound transducer, wherein the first and second ultrasound transducers are in spaced arrangement in a direction parallel to the longitudinal axis of the pipe section.

By "ultrasound" is meant sound at a frequency of greater than 20 kHz. Typically, ultrasound devices operate with frequencies from 20 kHz up to several gigahertz.

Whilst the invention is particularly useful for operating with small pipes as described above, it can also be applied to larger pipes for at least the same aforementioned reasons.

In a second aspect of the invention, a method for measuring fluid flow in a pipe is provided, the method comprising the steps of:
(a) Passing a fluid in a given direction through the pipe section of a device according to the first aspect of the invention; then
(b) Passing an ultrasonic beam between each pair of ultrasound transducers in an upstream and downstream direction with respect to the given direction of flow of the fluid; then
(c) Measuring the time the ultrasonic beam takes to pass between each pair of ultrasound transducers in an upstream and downstream direction with respect to the given direction of flow of the fluid; and
(d) Calculating the flow rate of the fluid.

SUMMARY OF THE FIGURES

The invention is now illustrated with reference to the following figures in which.

DETAILED DESCRIPTION OF THE INVENTION

Figure 1A:
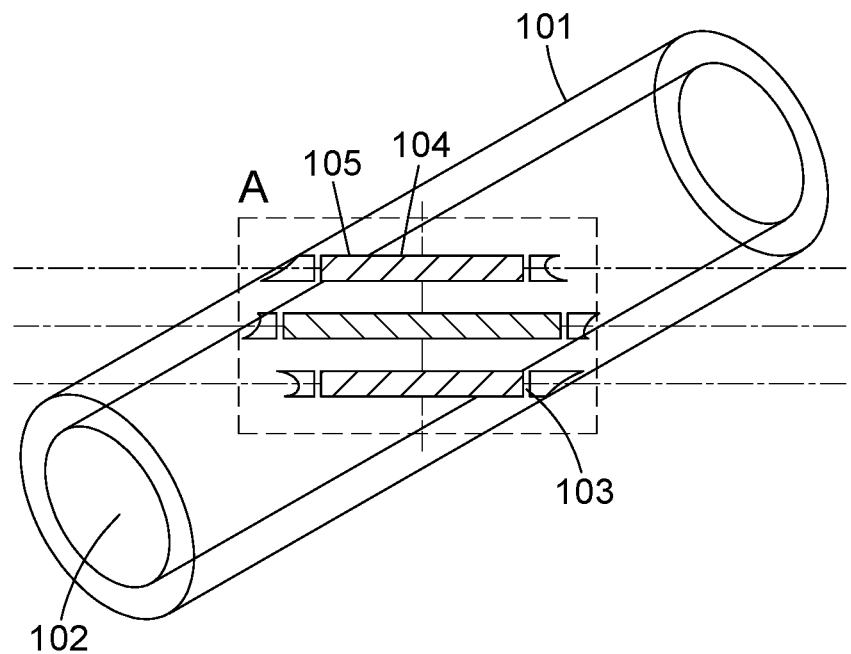
FIG. 1a shows an isometric view of a pipe of circular cross-section comprising ultrasound transducers.

In a first aspect of the invention, a device for measuring fluid flow in a pipe is provided, the device comprising:
(a) A pipe section comprising an even number of walls in the range 4-16, a first and second end, and a longitudinal axis, the pipe section of polygonal cross-section, and wherein the ratio of the width to the height of the cross-section is in the range 0.3:1 to 1:0.3;
(b) A plurality of ultrasound transducers, wherein each ultrasound transducer comprises an emitter and receiver, each ultrasound transducer arranged on the walls of the pipe section and generating a signal when the transducers emit ultrasound through any fluid flowing in the pipe section and/or receive said ultrasound; and
(c) A signals converter for processing the signals into a fluid flow rate value;

wherein opposing walls of the pipe section are of identical length and width;

wherein the plurality of ultrasound transducers comprise pairs of ultrasound transducers arranged on opposing walls or the same wall of the pipe section, wherein the device comprises at least two pairs of ultrasound transducers, wherein each pair of ultrasound transducers comprises a first and second ultrasound transducer, the first ultrasound transducer arranged to emit ultrasound through any fluid flowing in the pipe section towards the second ultrasound transducer and to receive ultrasound emitted by the second ultrasound transducer, wherein the first and second ultrasound transducers are in spaced arrangement in a direction parallel to the longitudinal axis of the pipe section.

Preferably, the plurality of ultrasound transducers are, as shown in the Figures, inserted into the walls of the pipe section rather than clamped to the exterior surface of the walls of the pipe section.

Preferably, when the pipe section comprises 4 walls, the plurality of ultrasound transducers are arranged on the walls of the pipe section in a region up to at least 70, 80, 90% of the distance between the median of the wall and the adjacent wall thereby to improve the fluid flow measurement.

The fluid is a liquid and/or a gas.

The pipe section may comprise an even number of walls in the range 4-14, 4-12, 4-10, 4-8, 4-6, or may comprise 4 walls.

All the walls of the pipe section may be of identical length and width.

The ratio of the width to the height of the pipe section may be in the range 0.4:1 to 1:0.4, 0.5:1 to 1:0.5, 0.6:1 to 1:0.6, 0.7:1 to 1:0.7, 0.8:1 to 1:0.8, 0.9:1 to 1:0.9, or 1:1.

The device may comprise 2 to 200, 2 to 150, 3 to 100, 3 to 50, 3 to 25 pairs of ultrasound transducers.

The plurality of ultrasound transducers may be in the form of an array of ultrasound transducers. Each ultrasound transducer can be operated simultaneously or independently of the others and, in the latter case, by varying the timing of operation, for instance by operating each ultrasound transducer with sequential delay going up a line of ultrasound transducers, a pattern of constructive interference is set up that results in radiating a quasi-plane ultrasonic beam at an angle depending on the progressive time delay. Thus by changing the progressive time delay the beam can be steered.

The first and second ultrasound transducers may be arranged on the walls of the pipe section in respectively two parallel cross-sectional planes. Alternatively, the first ultrasound transducers may be arranged on the walls of the pipe section in a plurality of parallel cross-sectional planes and the second ultrasound transducers may be arranged on the walls of the pipe section in a plurality of parallel cross-sectional planes in spaced arrangement from the parallel cross-sectional planes of their respective first ultrasound transducers.

All the first and second ultrasound transducers may be arranged on opposing walls of the pipe section respectively. Thus the ultrasound beam generated when the device is operating may adopt a "/" or "N" shaped path. In one embodiment, all the first ultrasound transducers are aligned such that when the device is operating all ultrasound beams project in parallel.

All of the first and second ultrasound transducers may be arranged on the same wall. Thus the ultrasound beam generated when the device is operating may adopt a "V" or "W" shaped path. In one embodiment, all the first ultrasound transducers are aligned such that when the device is operating all ultrasound beams are in parallel.

Alternatively, when there are at least two pairs of ultrasound transducers the first and second ultrasound transducers may be arranged on a mixture of opposing walls and the same wall of the pipe section respectively.

In one embodiment, the first and second ultrasound transducers are arranged on the walls of the pipe section in respectively two parallel cross-sectional planes, wherein all the first and second ultrasound transducers are arranged on opposing walls of the pipe section respectively, and wherein the first transducers are arranged on opposing walls and the second transducers are arranged on opposing walls, preferably wherein the pipe section comprises 4 walls. One advantage of the foregoing embodiment is the ability of measuring the fluid flow in a pipe when the flow is swirling.

In one embodiment, the cross-sectional planes are perpendicular to the longitudinal axis of the pipe section or the direction of flow of a fluid in the pipe section.

In one embodiment, the plurality of ultrasound transducers are arranged on all the walls.

In one preferred embodiment, the greater of the width or height of the cross-section is less than 150, less than 125, less than 100, less than 75, less than 50 mm, and preferably at least 10, at least 12 mm.

The device may additionally comprise flared pipe sections attached to each of the first and second ends of the pipe section thereby to permit attachment to upstream and a downstream pipe sections of circular cross-section, preferably wherein an internal diameter of the upstream and downstream pipe sections is at least equal to the distance between opposing external vertices of the pipe section polygonal cross-section, more preferably wherein the internal diameter of the upstream and a downstream pipe sections is substantially equal to the distance between external opposing vertices of the pipe section polygonal cross-section. The more preferred embodiment of internal diameter allows the pipe section to fit sensibly into the upstream and a downstream pipe sections thereby improving the stability of the fluid dynamics for the device which is then less affected by installation between the upstream and downstream pipe sections.

In a second aspect of the invention, a method for measuring fluid flow in a pipe is provided, the method comprising the steps of:
 (a) Passing a fluid in a given direction through the pipe section of a device according to the first aspect of the invention; then
 (b) Passing an ultrasonic beam between each pair of ultrasound transducers in an upstream and downstream direction with respect to the given direction of flow of the fluid; then
 (c) Measuring the time the ultrasonic beam takes to pass between each pair of ultrasound transducers in an upstream and downstream direction with respect to the given direction of flow of the fluid; and
 (d) Calculating the flow rate of the fluid.

Passing of the ultrasonic beams between each pair of ultrasound transducers may be carried out simultaneously for all ultrasound transducers, in a pre-determined sequential order, or a mixture of simultaneously for a portion of the ultrasound transducers and in a pre-determined sequential order for the remainder of the ultrasound transducers.

FIG. 1a shows an isometric view of a pipe (101) of circular cross-section comprising ultrasound transducers (103) located inside transducer ports (105). In use, a fluid passes through the bore (102) of the pipe, and ultrasound beams (104) are emitted and received by the transducers on opposing sides of the pipe thereby to measure using signals the difference in the time of passage of the beams across the pipe when travelling in the direction of flow of the fluid and against the direction of flow of the fluid. The transducers are, in practice, connected to a signals converter for processing the signals into a fluid flow rate value as previously described. The ultrasound beams are arranged to be projected in parallel so that the fluid flow at many points across the pipe can be measured.

Figure 1B:
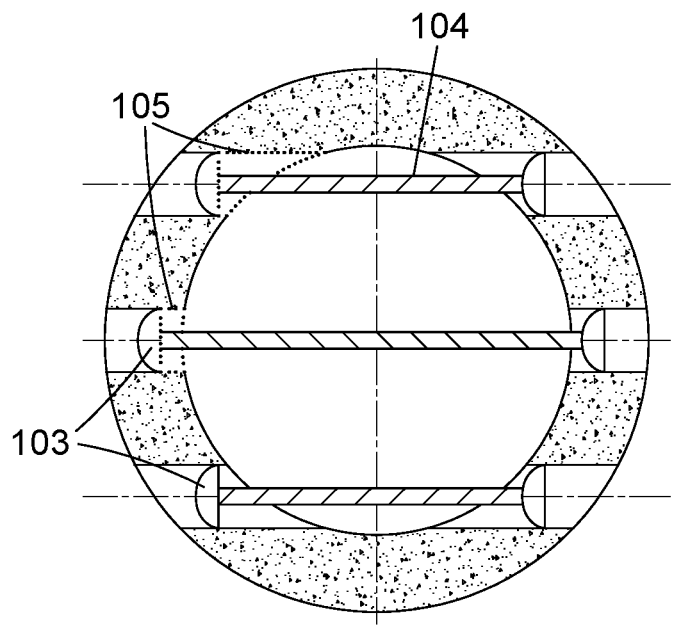
FIG. 1b shows a cross-section of the pipe shown in FIG. 1a in the plane marked "A" which is orientated at an angle traversing the pipe of FIG. 1a and coincident to the plane of the ultrasound beams.

FIG. 1b shows a cross-section of the pipe shown in FIG. 1a in the plane marked "A" which is orientated at an angle traversing the pipe of FIG. 1a and coincident to the plane of the ultrasound beams (104). FIG. 1b clearly shows how the depth of the transducer ports (105) (see, for example, areas outlined with dotted lines) varies across the pipe with those nearer the top and bottom of the pipe deeper than those nearer the middle of the pipe. The transducer ports interfere with the passage of the ultrasound beams (104) in their vicinity and thus the effect of this interference is greater for ultrasound beams which traverse the top and bottom of the pipe. Thus not only does this mean that the degree of interference from the transducer ports varies across the pipe, but also, because the ultrasound beam length nearer the top and bottom of the pipe are actually shorter than those nearer the middle of the pipe, the effect of the transducer port interference on the accuracy of the time of flight of the ultrasound beam is doubly enhanced. Thus the accuracy of the time of flight of the ultrasound beam nearer the top and bottom of the pipe is significantly less than that for ultrasound beams nearer the middle of the pipe.

Figure 2A:
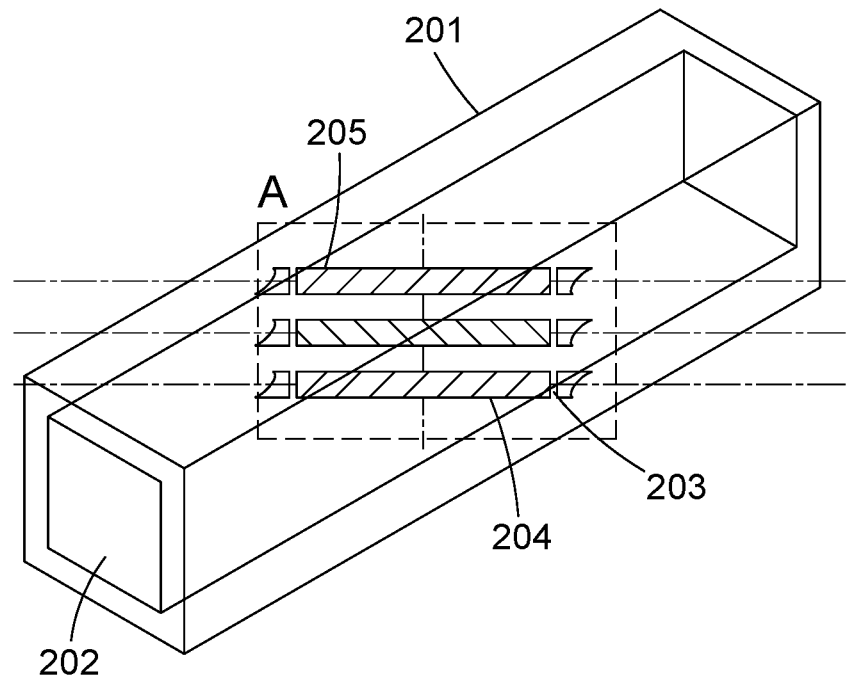
FIG. 2a shows an isometric view of a pipe of square cross-section comprising ultrasound transducers in accordance with one embodiment of the invention.

In contrast FIG. 2a shows an isometric view of a pipe (201) of square cross-section comprising ultrasound transducers (203) located inside transducer ports (205) on opposing sides of the pipe in accordance with one embodiment of the invention. In use, a fluid passes through the bore (202) of the pipe, and ultrasound beams (204) are emitted and received by the transducers on opposing sides of the pipe thereby to measure using signals the difference in the time of passage of the beams across the pipe when travelling in the direction of flow of the fluid and against the direction of flow of the fluid. The transducers are, in practice, connected to a signals converter for processing the signals into a fluid flow rate value as previously described. The ultrasound beams are arranged to be projected in parallel so that the fluid flow at many points across the pipe can be measured.

Figure 2B:
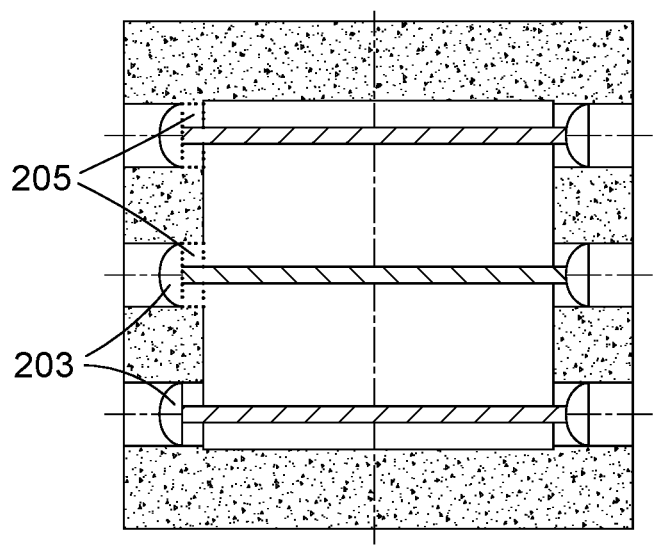
FIG. 2b shows a cross-section of the pipe shown in FIG. 2a in the plane marked "A" which is orientated at an angle traversing the pipe of FIG. 2a and coincident to the plane of the ultrasound beams.

FIG. 2b shows a cross-section of the pipe shown in FIG. 2a in the plane marked "A" which is orientated at an angle traversing the pipe of FIG. 2a and coincident to the plane of the ultrasound beams (204). FIG. 2b clearly shows how, and in contrast to the arrangement in a pipe of circular cross-section shown in FIG. 1a, the depth of the transducer ports (205) (see, for example, areas outlined with dotted lines) does not vary across the pipe insofar as those nearer the top and bottom of the pipe are the same depth as those nearer the middle of the pipe because the transducer ports do not need to account for any curvature of the pipe. Thus the degree of interference from the transducer ports is consistent across the pipe. Furthermore, and for the same reason, the length of the ultrasound beam is the same across the pipe and not reduced nearer the top and bottom of the pipe. Therefore the accuracy of the time of flight of the ultrasound beam nearer the top and bottom of the pipe is significantly better than for a pipe of circular cross-section and indeed the same as that for ultrasound beams nearer the middle of the pipe, i.e., it is uniform across the pipe.

Figure 3:
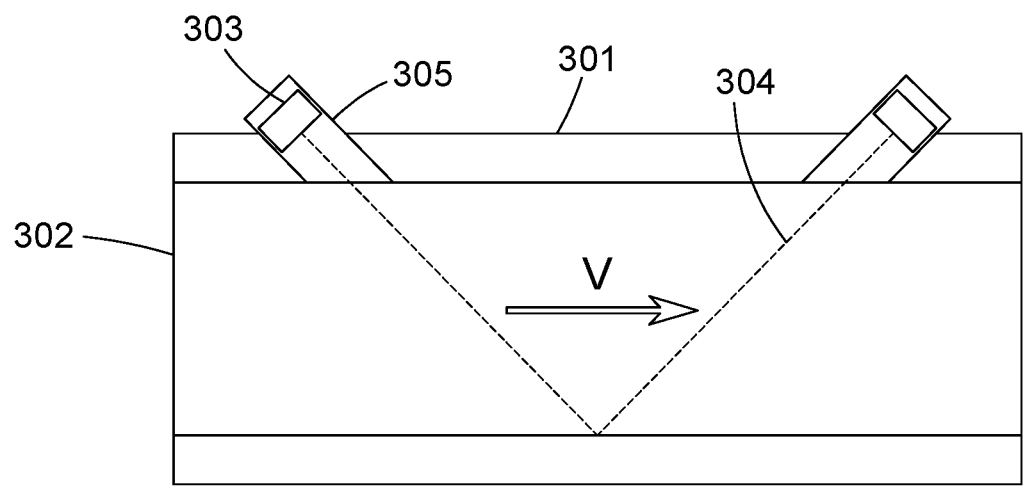
FIG. 3 shows a longitudinal-section of a pipe of square cross-section comprising ultrasound transducers.

FIG. 3 is a longitudinal-section of a pipe (301) of square cross-section comprising ultrasound transducers (303) located inside transducer ports (305) on the same side of the pipe. In use, a fluid passes through the bore (302) of the pipe, and ultrasound beams (304) are emitted and received by the transducers on the same side of the pipe via reflection of the beam from the opposing side of the pipe thereby to measure using signals the difference in the time of passage of the beams across the pipe when travelling in the direction of flow of the fluid (designated "V" in FIG. 3) and against the direction of flow of the fluid. The advantage of this arrangement of reflecting the ultrasound beams from an opposing side of the pipe is that the path length increases thereby increasing the accuracy of the time based measurement. The transducers are, in practice, connected to a signals converter for processing the signals into a fluid flow rate value as previously described. The ultrasound beams are arranged to be projected in parallel so that the fluid flow at many points across the pipe can be measured.

The invention claimed is:

1. A device for measuring fluid flow in a pipe, the device comprising:
   (a) a pipe section of polygonal cross section, the pipe section configured for fluid flow there through, the pipe section comprising an even number of walls in the range 4-16, a first and second end, and a longitudinal axis, and a ratio of the width to the height of the cross-section is in the range 0.3:1 to 1:0.3;
   (b) a plurality of ultrasound transducers, each ultrasound transducer comprising an emitter and receiver, each ultrasound transducer inserted into a wall of the pipe section and generating a signal when the transducers emit ultrasound through any fluid flowing in the pipe section and/or receive the ultrasound; and
   (c) a signals converter for processing the signals into a fluid flow rate value,
   wherein opposing walls of the pipe section are of identical length and width,
   the plurality of ultrasound transducers comprise pairs of ultrasound transducers arranged in opposing walls and/or the same wall of the pipe section,
   the device comprises at least two pairs of ultrasound transducers,
   each pair of ultrasound transducers comprises a first and second ultrasound transducer, the first ultrasound transducer arranged to emit ultrasound through any fluid flowing in the pipe section towards the second ultrasound transducer and to receive ultrasound emitted by the second ultrasound transducer, and
   the first and second ultrasound transducers are in spaced arrangement in a direction parallel to the longitudinal axis of the pipe section.

2. The device for measuring fluid flow in a pipe according to claim 1, wherein the fluid is a liquid and/or a gas.

3. The device for measuring fluid flow in a pipe according to claim 1, wherein the pipe section comprises an even number of walls in the range 4-14 walls.

4. The device for measuring fluid flow in a pipe according to claim 1, wherein all the walls of the pipe section are of identical length and width.

5. The device for measuring fluid flow in a pipe according to claim 1, wherein the ratio of the width to the height of the pipe section is in the range 0.4:1 to 1:0.4.

6. The device for measuring fluid flow in a pipe according to claim 1 comprising 2 to 200 pairs of ultrasound transducers.

7. The device for measuring fluid flow in a pipe according to claim 1, wherein the plurality of ultrasound transducers may be in the form of an array of ultrasound transducers.

8. The device for measuring fluid flow in a pipe according to claim 1, wherein the first and second ultrasound transducers are arranged in the walls of the pipe section in respectively two parallel cross-sectional planes, or the first ultrasound transducers are arranged in the walls of the pipe section in a plurality of parallel cross-sectional planes and the second ultrasound transducers are arranged in the walls of the pipe section in a plurality of parallel cross-sectional planes.

9. The device for measuring fluid flow in a pipe according to claim 1, wherein all the first and second ultrasound transducers are arranged in opposing walls of the pipe section respectively.

10. The device for measuring fluid flow in a pipe according to claim 1, wherein all of the first and second ultrasound transducers are arranged in the same wall.

11. The device for measuring fluid flow in a pipe according to claim 1, wherein the first and second ultrasound transducers are arranged in the walls of the pipe section in respectively two parallel cross-sectional planes, all the first and second ultrasound transducers are arranged in opposing walls of the pipe section respectively, and the first transducers are arranged in opposing walls and the second transducers are arranged in opposing walls.

12. The device for measuring fluid flow in a pipe according to claim 1, wherein the plurality of ultrasound transducers are arranged in all the walls.

13. The device for measuring fluid flow in a pipe according to claim 1, wherein the greater of the width or height of the cross-section is less than 150 mm.

14. The device for measuring fluid flow in a pipe according to claim 1, wherein flared pipe sections are attached to each of the first and second ends of the pipe section thereby to permit attachment to upstream and a downstream pipe sections of circular cross-section.

15. A method for measuring fluid flow in a pipe, the method comprising the steps of:
   (a) passing a fluid in a given direction through the pipe section of a device according to claim 1;
   (b) passing an ultrasonic beam between each pair of ultrasound transducers in an upstream and downstream direction with respect to the given direction of flow of the fluid;
   (c) measuring the time the ultrasonic beam takes to pass between each pair of ultrasound transducers in an upstream and downstream direction with respect to the given direction of flow of the fluid; and
   (d) calculating the flow rate of the fluid.

16. The device for measuring fluid flow in a pipe according to claim 9, wherein all the first ultrasound transducers are aligned such that all ultrasound beams, when the device is in use, are in parallel.

17. The device for measuring fluid flow in a pipe according to claim 10, wherein all the first ultrasound transducers are aligned such that all ultrasound beams, when the device is in use, project in parallel.

18. The device for measuring fluid flow in a pipe according to claim 1, wherein the ultrasound transducers are arranged within transducer ports.

* * * * *